United States Patent
Davis et al.

(10) Patent No.: US 8,294,376 B2
(45) Date of Patent: Oct. 23, 2012

(54) FAST REIGNITION OF A HIGH INTENSITY DISCHARGE LAMP

(75) Inventors: Gregory Davis, Maynardville, TN (US); Moshe Shloush, Knoxville, TN (US)

(73) Assignee: Lumetric Lighting, Inc., Oak Ridge, TN (US)

( * ) Notice: Subject to any disclaimer, the term of this patent is extended or adjusted under 35 U.S.C. 154(b) by 328 days.

(21) Appl. No.: 12/790,830

(22) Filed: May 30, 2010

(65) Prior Publication Data
US 2011/0291593 A1    Dec. 1, 2011

(51) Int. Cl.
*G05F 1/00*  (2006.01)
(52) U.S. Cl. ......... 315/194; 315/220; 315/224; 315/360
(58) Field of Classification Search .................. 315/312, 315/313, 316, 314, 315, 320, 307, 308, 293, 315/294, 297, 219, 209 R, 225, 246, 276, 315/289–291
See application file for complete search history.

(56) References Cited

U.S. PATENT DOCUMENTS

| | | |
|---|---|---|
| 3,944,876 A | 3/1976 | Helmuth |
| 4,100,476 A | 7/1978 | Ghiringhelli |
| 4,207,497 A | 6/1980 | Capewell et al. |
| 4,207,498 A | 6/1980 | Spira et al. |
| 4,210,846 A | 7/1980 | Capewell et al. |
| 4,396,872 A | 8/1983 | Nutter |
| 4,598,232 A | 7/1986 | Nilssen |
| 4,652,797 A | 3/1987 | Nilssen |
| 4,745,341 A | 5/1988 | Herres |
| 4,851,739 A | 7/1989 | Nilssen |
| 4,862,040 A | 8/1989 | Nilssen |
| 4,874,989 A | 10/1989 | Nilssen |
| 4,896,077 A | 1/1990 | Dodd et al. |
| 4,928,039 A | 5/1990 | Nilssen |
| 4,935,669 A | 6/1990 | Nilssen |
| 4,939,430 A | 7/1990 | Droho |
| 4,949,018 A | 8/1990 | Siglock |
| 4,962,336 A | 10/1990 | Dodd et al. |

(Continued)

FOREIGN PATENT DOCUMENTS

EP    0698336 A4    2/1996

(Continued)

OTHER PUBLICATIONS

International Search Report and Written Opinion dated Nov. 14, 2011 for International Application No. PCT/US2011/037620.
HIB Electronic Ballast, ROMlight International Inc., 2 pages, [online] [Retrieved on Jun. 6, 2009] Retrieved from the internet <URL:http://www.romlightintl.com/ballasts.cfm>.
Crockett, J., "Dimmable Ballasts: Consider Digital," Consulting-Specifying Engineer, Specifier's Notebook, Aug. 2006, 1 page.
"Lumenergi Executive Summary," Lumenergi LLC, Nov. 21, 2006, 2 pages.
Dilouie, C., "DALI XP Draft Standard Promises Major Breakthrough in Digital Lighting," Lighting Controls Association, Sep. 2008, 3 pages [online] [Retrieved on Jul. 14, 2009] Retrieved from the internet <URL:http://www.aboutlightingcontrols.org/education/papers/2008_dalixp.shtml>.

(Continued)

*Primary Examiner* — Shawki Ismail
*Assistant Examiner* — Christopher Lo
(74) *Attorney, Agent, or Firm* — The Mueller Law Office, PC

(57) ABSTRACT

Embodiments of the present invention provide for the rapid reignition of a high intensity discharge lamp. In one embodiment of the invention, an apparatus for a fast reignition of a high intensity discharge lamp is disclosed. The apparatus is comprised of a ballast operatively coupled to the lamp that is configured to receive power from a power supply. The apparatus is also comprised of a timer circuit that enters a timing phase and produces a quantum of timing information when the lamp ceases receiving power from the power supply. This timer circuit does not require external power during the timing phase. The apparatus is additionally comprised of a control circuit that receives the timing information and permits the ballast to reignite the lamp based on the information.

17 Claims, 9 Drawing Sheets

U.S. PATENT DOCUMENTS

| | | | |
|---|---|---|---|
| 4,988,920 A | 1/1991 | Hoeksma | |
| 4,996,464 A | 2/1991 | Dodd et al. | |
| 4,999,547 A | 3/1991 | Ottenstein | |
| 5,303,910 A | 4/1994 | McGill et al. | |
| 5,457,360 A | 10/1995 | Notohamiprodjo et al. | |
| 5,458,075 A | 10/1995 | Tice et al. | |
| 5,459,375 A | 10/1995 | Nilssen | |
| 5,489,823 A | 2/1996 | Nilssen | |
| 5,530,322 A | 6/1996 | Ference et al. | |
| 5,550,439 A | 8/1996 | Nilssen | |
| 5,608,291 A | 3/1997 | Nilssen | |
| 5,619,077 A | 4/1997 | Green et al. | |
| 5,623,256 A | 4/1997 | Marcoux | |
| 5,661,468 A | 8/1997 | Marcoux | |
| 5,691,603 A | 11/1997 | Nilssen | |
| 5,736,819 A | 4/1998 | Nilssen | |
| 5,757,140 A | 5/1998 | Nilssen | |
| 5,801,494 A | 9/1998 | Herres et al. | |
| 5,839,382 A | 11/1998 | Tice et al. | |
| 5,886,481 A | 3/1999 | Flory, IV et al. | |
| 5,990,634 A | 11/1999 | Brown | |
| 6,107,749 A | 8/2000 | Nilssen | |
| 6,135,040 A | 10/2000 | Tice et al. | |
| 6,232,727 B1 | 5/2001 | Chee et al. | |
| 6,297,612 B1 | 10/2001 | Shloush et al. | |
| 6,392,365 B1 | 5/2002 | Zhou et al. | |
| 6,407,515 B1 | 6/2002 | Hesler | |
| 6,486,615 B2 | 11/2002 | Hui et al. | |
| 6,650,067 B1 | 11/2003 | Shloush et al. | |
| 7,098,598 B2 | 8/2006 | Tripathi et al. | |
| 7,109,668 B2 | 9/2006 | Pogodayev et al. | |
| 7,129,647 B2 | 10/2006 | DuLaney et al. | |
| 7,180,251 B2 | 2/2007 | van Eerden | |
| 7,190,151 B2 | 3/2007 | Ribarich et al. | |
| 7,235,932 B2 | 6/2007 | Crandall et al. | |
| 7,252,406 B2 | 8/2007 | Crandall | |
| 7,262,559 B2 | 8/2007 | Tripathi et al. | |
| 7,307,386 B2 | 12/2007 | Fishbein et al. | |
| 7,309,975 B2 | 12/2007 | Fishbein et al. | |
| 7,355,354 B2 | 4/2008 | Rust et al. | |
| 7,388,334 B2 | 6/2008 | Crandall et al. | |
| 2003/0111969 A1 | 6/2003 | Konishi et al. | |
| 2005/0258765 A1 | 11/2005 | Rodriguez et al. | |
| 2005/0264217 A1* | 12/2005 | Huston et al. | 315/77 |
| 2006/0197470 A1* | 9/2006 | Ribarich et al. | 315/291 |
| 2006/0197473 A1 | 9/2006 | Fukuwa | |
| 2006/0279944 A1 | 12/2006 | Burnett et al. | |
| 2007/0041181 A1 | 2/2007 | Shofar | |
| 2007/0075647 A1* | 4/2007 | Tsintzouras et al. | 315/119 |
| 2007/0132704 A1 | 6/2007 | Burnett et al. | |
| 2010/0109572 A1 | 5/2010 | Kamoi et al. | |

FOREIGN PATENT DOCUMENTS

| | | |
|---|---|---|
| EP | 1196012 A2 | 4/2002 |
| EP | 1493621 A2 | 1/2005 |
| EP | 1615479 A2 | 1/2006 |
| EP | 1724909 A2 | 11/2006 |
| EP | 1754933 A1 | 2/2007 |
| WO | 2005043955 | 5/2005 |

OTHER PUBLICATIONS

Yarris, L., "Feeling the Heat: Berkeley Researchers Make Thermoelectric Breakthrough in Silicon Nanowires," Research News Berkeley Lab, Jan. 9, 2008, 3 pages [online] [Retrieved on Jul. 14, 2009] Retrieved from the internet <URL:http://www.lbl.gov/Science-Articles/Archive/MSD-silicon-nanowires.html>.

"IEPC Corporation, VB Sales," Process Register, Last Updated Jul. 13, 2009, 1 page [online] [Retrieved on Jul. 14, 2009] Retrieved from the internet <URL:http://www.processregister.com/IEPC_Corporation_VB_Sales/Supplier/sid7582.htm>.

"Greening the Lighting Industry for High Performance with LED Systems (IEPC)," California Green Solutions, 4 pages [online] [Retrieved on Jul. 14, 2009] Retrieved from the internet <URL:http://www.californiagreensolutions.com/cgi-bin/gt/tpl.h,content=1719>.

"IEPC International Engineering Products & Consulting: VB400 Lighting Control Optimizes HID Lamp Performance," New Equipment Digest, May 29, 2007, 1 page [online] [Retrieved on Jul. 14, 2009] Retrieved from the internet <URL:http://www.newequipment.com/303/ProductDetail/61958/VB400_Lighting_Control_Optimizes_HID_Lamp_Performance.aspx>.

Product News—"Lighting Control System suits fluorescent applications," Sep. 19, 2007; Original Press Release: "VBC Lighting Control Now Available for Fluorescent Applications," Aug. 27, 2007, ThomasNet Industrial NewsRoom, 6 pages [online] [Retrieved on Jul. 14, 2009] Retrieved from the internet <URL:http://news.thomasnet.com/fullstory/804617>.

Product News—"Lighting Control offers efficient option for HID users," May 31, 2007; Original Press Release: "VB400 Lighting Control Saves Energy and Costs Over T5/T8 Replacements," May 8, 2007, ThomasNet Industrial NewsRoom, 4 pages [online] [Retrieved on Jul. 14, 2009] Retrieved from the Internet <URL:http://news.thomasnet.com/fullstory/518726>.

Company Profile for IEPC Corp., Last Modified Mar. 9, 2008, [online] [Retrieved on Mar. 9, 2008] Retrieved from the internet <URL:http://www.thomasnet.com/profilenews.html?cid=10111507&navsec=news&WT.mc_t=INR&WT.mc_n=minf>.

"IEPC Corp.'s Re-Lamping Program Ensures Brightness, Energy Savings Over Time," IEPC Corporation International Engineering Products & Consulting, May 8, 2007, 3 pages, can be retrieved at <URL:http://recmgmt.com/rmnews/0508.relamping.pr.pdf>.

"Getting the Most Lighting for the Buck," Electrical Contracting Products, Cygnus Business Media, Jul. 8, 2008, 8 pages [online] [Retrieved on Jul. 14, 2009] Retrieved from the internet <URL:http://www.ecpzone.com/publication/article.jsp?publd=2&id=2669&pageNum=1>.

International Engineering Products and Consulting Corporation Homepage, IEPC Corp., 1 page [online] [Retrieved on Jul. 14, 2009] Retrieved from the Internet <URL:http://www.iepc.cc/?page=home>.

LUM Energy—Company, Lumenergi, 2006, 3 pages [online] [Retrieved on Dec. 18, 2007] Retrieved from the Internet <URL:http://www.lumenergi.com/company.html>.

LUM Energy—Lighting, Lumenergi, 2006, 1 page [online] [Retrieved on Dec. 18, 2007] Retrieved from the internet <URL:http://www.lumenergi.com/lighting.html>.

Cortese, A., "'Green' Buildings Don't Have to Be New," The New York Times, Jan. 27, 2008, 5 pages [online] [Retrieved on Feb. 5, 2008] Retrieved from the interne t<URL:http://www.nytimes.com/2008/01/27/realestate/c...c9d361&ex=1202360400&emc=eta1&pagewanted=print>.

High Intensity Discharge Lighting Technology Workshop Report, Nov. 15, 2005, 170 Pages.

"e-Vision—Delivering performance that drives your business forward," Halogen Conversion Brochure, Advance Transformer Co., 2008, 12 Pages.

"The ABC's of High Intensity Discharge (HID) Ballast," Advance Transformer Co., 2005, 24 Pages.

"Products and Services," DC Velocity, Feb. 2008, 1 Page, [online] [Retrieved on Jul. 20, 2009] Retrieved from the internet <URL:http://www.dcvelocity.com/products/?product_id=1007>.

"Advance Introduces Power New e-Vision® Electronic HID Ballast for Two 39W Metal Halide Lamps," Lighting Controls Association, 1 Page, [online] [Retrieved on Jul. 20, 2009] Retrieved from the internet <URL:http://www.aboutlightingcontrols.org/products/newprods/advance/advance-20060906.shtml>.

"Navigating New Worlds in Light," Brochure, MagneTek, Universal Triad, 2000, 4 Pages.

"L.A. County Slashes Energy Costs 77% With Retrofit Using MagneTek Electronic Ballasts," Protraits #7, MagnTek, Jul. 30, 1998, 2 Pages.

"Luminoptics Changes Name to Lumenergi," News Release, Lumenergi, Apr. 25, 2006, 2 Pages.

* cited by examiner

FAST REIGNITION OF A HIGH INTENSITY DISCHARGE LAMP

FIELD OF THE INVENTION

The invention relates generally to high intensity discharge lamps, and more specifically to the reignition of a high intensity discharge lamp.

BACKGROUND OF THE INVENTION

Gas discharge lamps produce light through the ignition and stabilization of an electric arc. An electric arc is the electrical breakdown of a gas which produces an ongoing plasma discharge. This electrical breakdown is achieved by applying an electrical field across the lamp. Once the breakdown occurs and the plasma is formed, electrons will flow through the plasma and its composite molecules from one terminal of the lamp to another. When the electrons collide with the composite molecules of the plasma they excite electrons on those molecules to a higher state. These electrons then emit a substantially equivalent amount of energy in the form of visible light as they descend back to their quiescent states.

Although electric arcs are extremely efficient, formation of an arc requires a significant pulse of energy. In gas discharge lamps, an arc is initially struck by applying an ignition pulse to the lamp. This process is referred to as "igniting" or "striking" the lamp. The ignition pulse will usually be a large voltage pulse applied across the terminals of the lamp. The voltage pulse needs to be high enough to exceed the electric breakdown of the chemicals within the lamp. The voltage required to start the lamp is a function of many different variables including the chemicals within the lamp, the temperature of those chemicals, and the general architecture of the lamp.

The relationship between temperature and the required magnitude of an ignition pulse is the root cause of a significant drawback inherent in gas discharge lighting. A lamp that produces light also produces heat which raises the temperature of the chemicals within the lamp. When the chemicals within a gas discharge lamp are heated, more energy is required to ignite the lamp. These aspects of gas discharge lamps combine to form what is called the hot reignition—or hot restrike—problem. If a lamp has been running for an appreciable amount of time, and is then shut-off, it will be extremely difficult to turn the lamp back on again. Oftentimes the pulse of energy that a system was designed to apply to the lamp under usual conditions will not be sufficient to reignite the lamp. In such cases, the hot reignition problem will lead to a situation where light will not be available from the lamp until enough time has passed for the lamp to sufficiently cool. In applications where continuous and responsive lighting is critical, this is an unacceptable condition.

The hot reignition problem has been recognized in the field of gas discharge lamps since its inception. Early approaches to this problem included leaving the lights on permanently and covering the lights with movable metal shutters to block the light when it wasn't needed. This approach increases the light source's responsiveness, but is also clearly power inefficient. Another family of early approaches involved applying a much larger or specially shaped ignition pulse to the lamp so that enough energy was applied to start the lamp even if the chemicals inside were still in an excited state. Although this approach decreases the start-up time of the lamps as compared to the approach of waiting for the lamp to cool, this approach could cause serious damage to the lamps because of the high energy levels required for hot-reignition pulses.

Lamp ignition stresses are a serious cause of lamp life degradation. As such, it is important to prevent a lighting system from conducting ignitions that fail to ignite the lamp and thereby needlessly tax the lamp's components. Needless strikes can also waste power as in the situation of a "cycling" lamp that is continuously reignited and extinguished because it has degraded. From the perspective of the hot reignition problem, failed reignition attempts are also harmful because failed attempts apply energy to the lamp and increase the lamp's temperature thereby extending the time that it will take for the lamp to cool. Inventions that seek to limit the number of failed ignitions relate to the problem of hot reignition because they all seek to eliminate the condition where a fruitless ignition pulse is delivered to a lamp that only serves to wear out the lamp components and waste energy.

There is prior art dealing with the problem of preventing unnecessary ignition attempts by limiting the number of reignition attempts after a certain amount of time, or after a certain amount of attempts. For example, there are approaches wherein a series of reignition pulses are turned off after a certain time period has elapsed. Likewise, a circuit may automatically detect if failed reignition pulses have generated a certain amount of heat, at which point the ignition circuit is disabled for a period of time. These approaches are particularly suited for a situation where specialized high-power reignition pulses are being applied because such pulses are even more likely to damage a lamp than regular strength ignition pulses. These approaches share the debilitating characteristic of taking action after the ignition pulses have failed. The main problem with approaches that cease attempting to ignite a lamp after an initial series of fruitless strikes is that the initial strikes still wear down the lamp, waste energy, reheat the lamp, and increase the overall time that must pass before the lamp is sufficiently cooled for reignition.

As compared to needless striking due to cycling or malfunctioning sensors, needless striking due to the hot reignition problem is somewhat more manageable. This is because a lamp's temperature can be measured directly, or estimated based on knowledge of how long it has been since the lamp went out. Therefore, many approaches in the prior art are focused on not allowing a reignition attempt for a certain period of time after the lamp has been shut off. For example, this approach may be used to protect delicate gas discharge bulbs in LCD screens from hot reignition attempts. In this example, a circuit monitors when a power off signal has been received, keeps track of how much time has passed since that signal was received, and prevents the reignition of the lamp until a certain amount of time has passed by not allowing a power on signal to trigger a reignition. Similarly, one may use a system for generating and supplying power wherein some of the devices being supplied may be gas discharge lamps. In this example, one may wait a certain amount of time after a brown-out to allow the lamps to cool before returning power to the lamps. In a similar approach, the operating conditions of the lamp are monitored directly to determine the state of the lamp, and a certain amount of time passes after a fault condition is detected before a reignition signal is sent. A control circuit monitors the time since the failure condition was detected, and sends the control signal to the lamp when it is time to reignite.

The approaches discussed in the previous paragraph all share the common drawback of requiring a separate circuit or system to keep track of how much time has passed since the lamp has gone out. In addition, many hot reignition situations occur because there is a momentary blip in the power supplied to the lamp. In these situations, separate circuitry powered by the same power supply as the lamp may be unable to function properly and assure that the system retains memory of when the lamp went out.

SUMMARY OF INVENTION

In one embodiment of the invention, an apparatus for a fast reignition of a high intensity discharge lamp is disclosed. The apparatus comprises a ballast operatively coupled to the lamp that is configured to receive power from a power supply. In addition, the apparatus comprises a timer circuit which is configured to enter a timing phase to produce a quantum of timing information when the lamp ceases receiving power from the power supply. The timer circuit additionally does not require external power during the timing phase. In addition, the apparatus comprises a control circuit which is configured to receive the quantum of timing information from the timer circuit and permit the ballast to reignite the lamp based on the quantum of timing information. Such a configuration produces an apparatus for a fast reignition of a high intensity discharge lamp.

In another embodiment of the invention, a method for a fast reignition of a high intensity discharge lamp is disclosed. In one step, a timer circuit is shifted into a timing phase when the lamp has ceased to receive power from a power supply. In another step, a quantum of timing information is produced independent of an external power source during the timing phase. In another step, a ballast is limited from re-striking the lamp for a period of time which is based at least in part on the quantum of timing information. Such a collection of steps produces a method for a fast reignition of a high intensity discharge lamp.

In another embodiment of the invention, an apparatus for a fast reignition of a high intensity discharge lamp is disclosed. The apparatus comprises a ballast operatively coupled to the lamp that is configured to receive power from a power supply. In addition, the apparatus comprises a resistive-capacitive timer circuit which is configured to be charged by the power supply, discharge when the lamp ceases to receive power from the power supply, and output a timer voltage. The ballast additionally will not strike the lamp if the timer voltage is above a predetermined voltage level. Such a configuration produces an apparatus for a fast reignition of a high intensity discharge lamp.

DETAILED DESCRIPTION OF THE PREFERRED EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers such modifications and variations as come within the scope of the appended claims and their equivalents.

An optimal lighting source is able to efficiently provide consistent light in rapid response to a user's request. Gas-discharge lamps are efficient but they are subject to the hot reignition problem. Since a heated lamp is difficult to ignite, a lamp which has just gone out will not be able to respond rapidly to a user's request for light. Striking a lamp when it is hot may cause damage to the lamp, and if the strike is unsuccessful it will reheat the lamp and extend the time until the lamp can be successfully reignited. The present invention allows a lamp to rapidly cool, and then reignites the lamp as soon as possible. Given that a common reason for lamps to extinguish is that the power supply has been interrupted, embodiments of the present invention advantageously do not require external power. The present invention assures that a lamp can deal sufficiently with hot reignition conditions by providing the lamp with a built-in system that allows it to protect itself.

Figure 1:
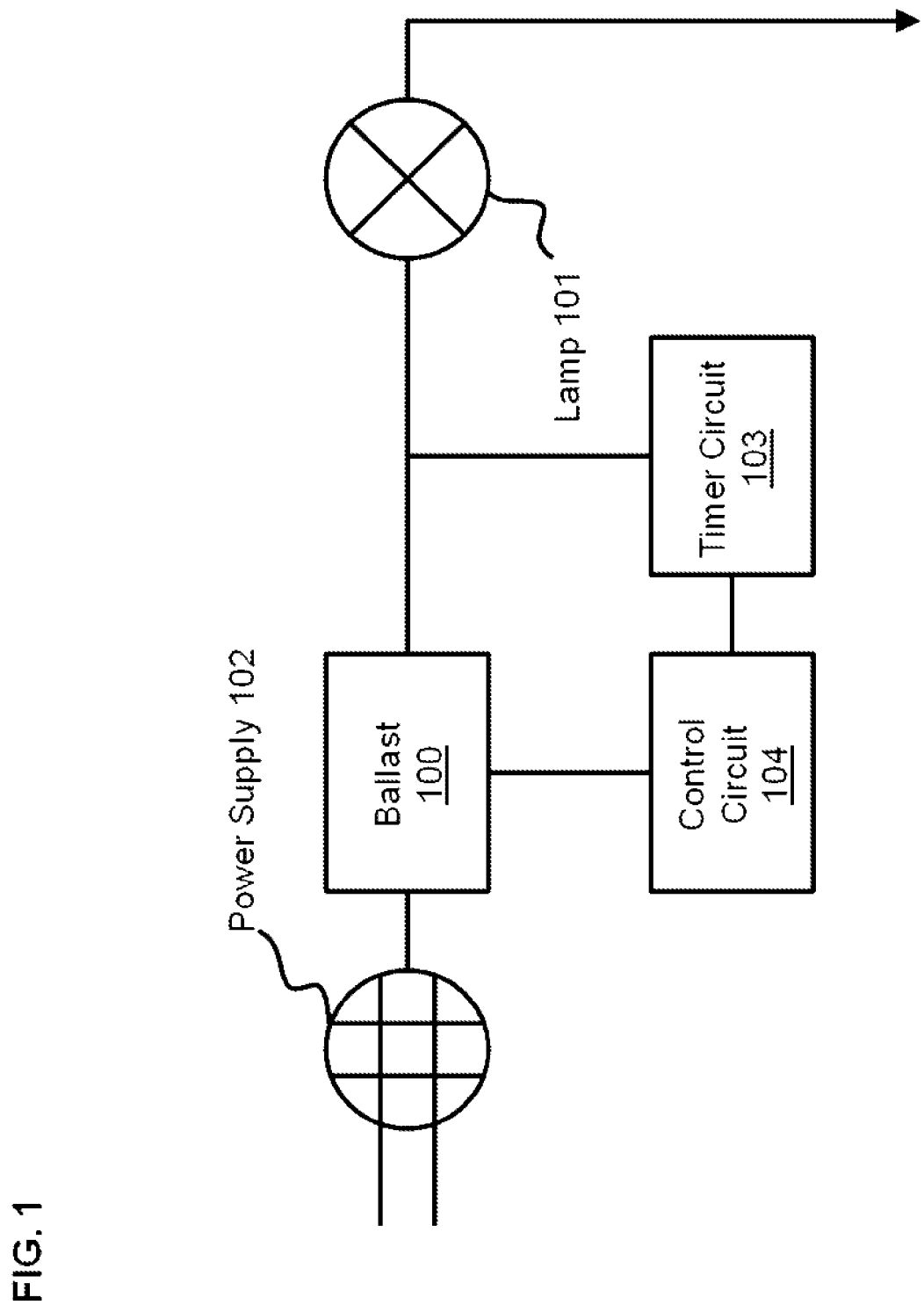
FIG. 1 illustrates a block diagram of an apparatus for a fast reignition of a high intensity discharge lamp that is in accordance with the present invention.

A specific embodiment of the present invention can be described with reference to FIG. 1. FIG. 1 displays an apparatus for the fast reignition of a high intensity discharge lamp. Ballast 100 is operatively couple to lamp 101. A ballast is used to maintain the stability of the electric arc in the lamps to which they are providing power. In FIG. 1, ballast 100 is configured to receive power from power supply 102. The ballast shapes the raw power available from the power supply to a particular format required for the lamp's stability. Timer circuit 103 is configured to enter a timing phase and produce a quantum of timing information when lamp 101 ceases to receive power from power supply 102. Control circuit 104 is configured to receive the quantum of timing information from the timer circuit, and permit the ballast to reignite the lamp based on the quantum of timing information. Although timer circuit 103 is shown connected to lamp 101 this configuration is only exemplary as this is only one way in which timer circuit 103 can be capable of reacting to a change in the condition of lamp 101.

In specific embodiments of the invention, the quantum of timing information is a length of time since the lamp went out.

Using this information, control circuit 104 is able to prevent ballast 100 from striking lamp 101 until it has sufficient time to cool-down. Therefore, ballast 100 will not unnecessarily strike and heat the lamp thereby increasing the overall cool-down time. Instead, control circuit 104 will allow ballast 100 to wait just enough time for lamp 101 to cool-down without disturbance, but not so long that time is unnecessarily wasted while a user waits for the light to turn back on.

In specific embodiments of the present invention, timer circuit 103 does not require external power during its timing phase. This is advantageous because the apparatus needs to retain memory of when lamp 101 ceased to receive power, but it would not be efficient to supply power to the entire apparatus when power supply 102 was interrupted. Therefore, in these embodiments of the invention, only the portion of the apparatus that must necessarily retain power does so which allows the apparatus to retain memory of when the lamp went off while at the same time maintaining power efficiency.

Figure 2:
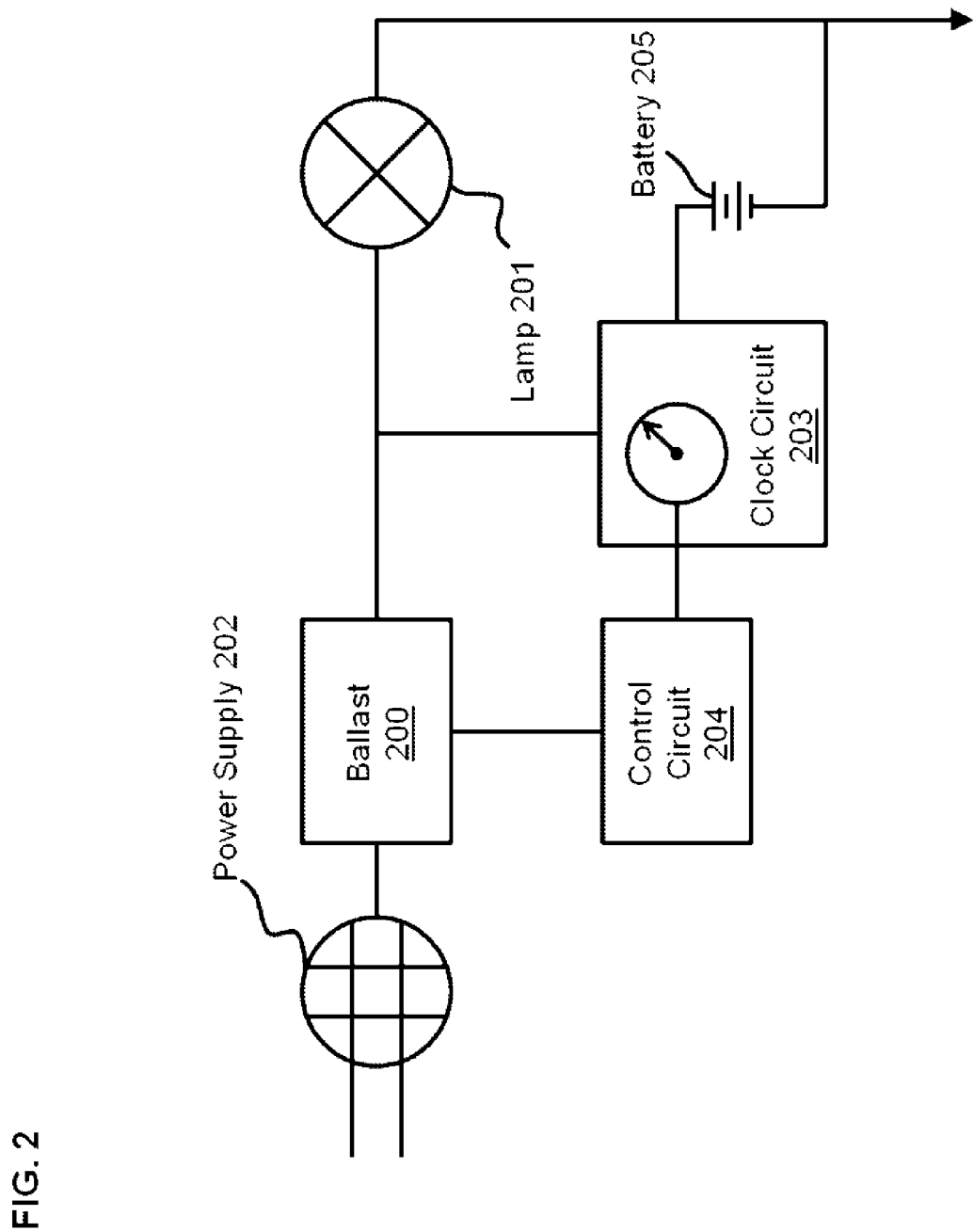
FIG. 2 illustrates a block diagram of an apparatus for a fast reignition of a high intensity discharge lamp using a clock circuit that is in accordance with the present invention.

Another specific embodiment of the present invention can be described with reference to FIG. 2. FIG. 2 illustrates a similar apparatus comprising ballast 200 operatively coupled to lamp 201. Ballast 200 is again configured to receive power from power supply 202. In addition, the apparatus in FIG. 2 comprises a clock circuit 203 configured to run when lamp 201 ceases to receive power from power supply 202, and to initialize when lamp 201 is ignited. Control circuit 204 is configured to receive timing information from clock circuit 203, and permit ballast 200 to reignite the lamp based on this timing information. Advantageously, the apparatus in FIG. 2 comprises a battery 205 that will power the control circuit without the need for an external power source. This is beneficial because lamp 201 will often go out because of an interruption in the power supplied by power supply 202.

In a specific embodiment of the present invention, clock circuit 203 keeps track of how much time has passed since lamp 201 went out in seconds, reports this value to control circuit 204, and reinitializes when lamp 201 is ignited. In turn, control circuit 204 waits until the number of seconds reported exceeds a predetermined period of time before it permits ballast 200 to reignite lamp 201.

Figure 3:
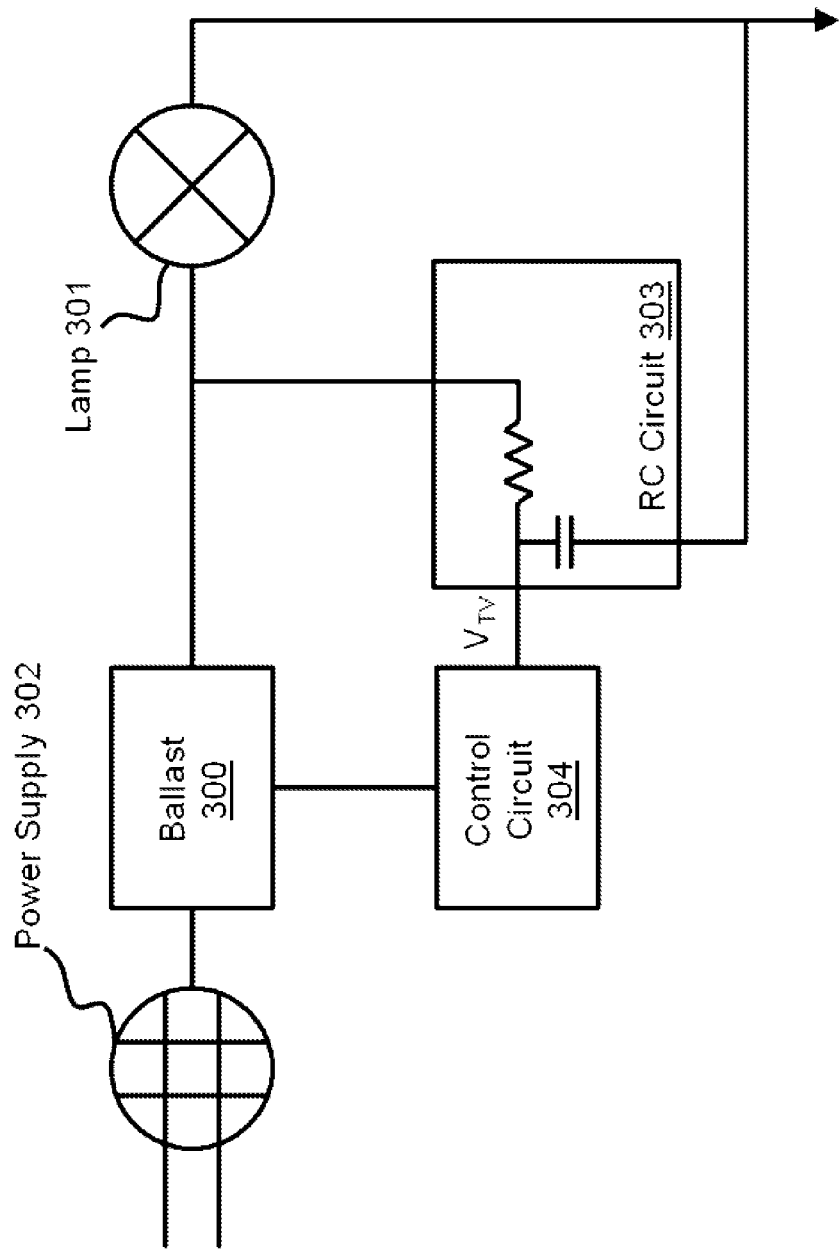
FIG. 3 illustrates a block diagram of an apparatus for a fast reignition of a high intensity discharge lamp using a resistive-capacitive circuit that is in accordance with the present invention.

Another specific embodiment of the present invention can be described with reference to FIG. 3. FIG. 3 illustrates a similar apparatus comprising ballast 300 operatively coupled to lamp 301. Ballast 300 is again configured to receive power from power supply 302. In addition, the apparatus in FIG. 3 comprises a resistive-capacitive (RC) circuit 303 configured to be charged by power supply 302 when lamp 301 is receiving power from power supply 302, to discharge when lamp 301 ceases to receive power from power supply 302, and to output a timer voltage on node $V_{TV}$. Control circuit 304 is configured to receive timing information from RC circuit 303 and permit ballast 300 to reignite lamp 301 based on this timing information.

In a specific embodiment of the present invention, this timing information is the voltage level on node $V_{TV}$ as compared to the voltage level on node $V_{TV}$ when RC circuit 303 is fully charged. Control circuit 304 is able to determine how long it has been since lamp 301 ceased to receive power because when the power is cut, RC circuit 303 will begin to discharge and the voltage on $V_N$ will therefore begin to drop. In turn, control circuit 304 will wait till the voltage on node $V_{TV}$ has dropped below a predetermined level before it permits ballast 300 to reignite lamp 301.

In specific embodiments of the present invention, the time period for which the control circuit will not permit the ballast to ignite the lamp can be set to the same value as the cool-down period of lamp. The period for which the control circuit will not permit the ballast to ignite the lamp can be called the strike-restriction period. When attempting to correlate the strike-restriction period with the cool-down period of the lamp, it is important for the two periods to match as closely as possible while favoring a longer strike-restriction period. As mentioned previously, it is advantageous to ignite the lamp as soon as possible because responsiveness to a user's request for lighting is a key performance metric for any lighting system. However, striking the lamp too soon will result in a failed reignition which will unnecessarily tax the lamp's components, and increase the lamp's temperature which will result in a commensurate increase in the overall time it will take to reignite the lamp.

Correlation of the strike-restriction period with the cool-down period of the lamp can be described with reference to both FIGS. 2 and 3. If an apparatus similar to that described with reference to FIG. 3 is used, the strike-restriction period will be determined based on the predetermined voltage level for which control circuit 304 is monitoring, and the RC time constant of RC circuit 303. The voltage-time relationship of a discharging RC circuit can be predicted with precision. Given the initial timer voltage to which the RC circuit is charged, and the resistance and capacitance values of the RC circuit, the time at which the timer voltage will decay to the predetermined value can also be known with precision. Therefore, correlating the strike-restriction period of the timer circuit and the cool-down period of the lamp requires calculated selection of the RC circuit component values and the control circuit's predetermined voltage level. If an apparatus similar to that described with reference to FIG. 2 is used, the strike restriction period can be set by designing clock circuit 203 to send a flag signal when the period has elapsed, or by allowing control circuit 204 to monitor the output of clock circuit 203 and terminate the restriction period when a predetermined time period equivalent to the strike-restriction period has passed. It is important to note that in the case of the control circuit 204 monitoring the output of clock circuit 203, embodiments of the invention where only clock circuit 203 retains power during an interruption in power supply 202 will require that the strike-restriction period be stored in non-volatile memory.

The correlation of the strike-restriction period to the cool-down period can be somewhat difficult because the cool-down period of the lamp may vary based on manufacturing variances, the ambient temperature, and the length of time for which the lamp was lit. As a result, it is advantageous to initialize the timer circuit based on factors such as the ambient temperature and how long the lamp was on before it went out. For example, if a lamp was only turned on for a few seconds it would not get much hotter than the ambient temperature of the room. In that case, it would not make sense to initialize the strike-restriction time as if the lamp had reached its much higher standard operating temperature because the lamp will cool and be ready to strike in a much shorter time period than if it had. If an apparatus similar to that described with reference to FIG. 2 is used, the initialization of the strike-restriction period can be calibrated by digitally altering the stored strike-restriction period. If an apparatus similar to that described with reference to FIG. 3 is used, calibrating the initialization of the strike-restriction period to the desired cool-down period will be slightly more complex and requires further discussion.

Figure 4:
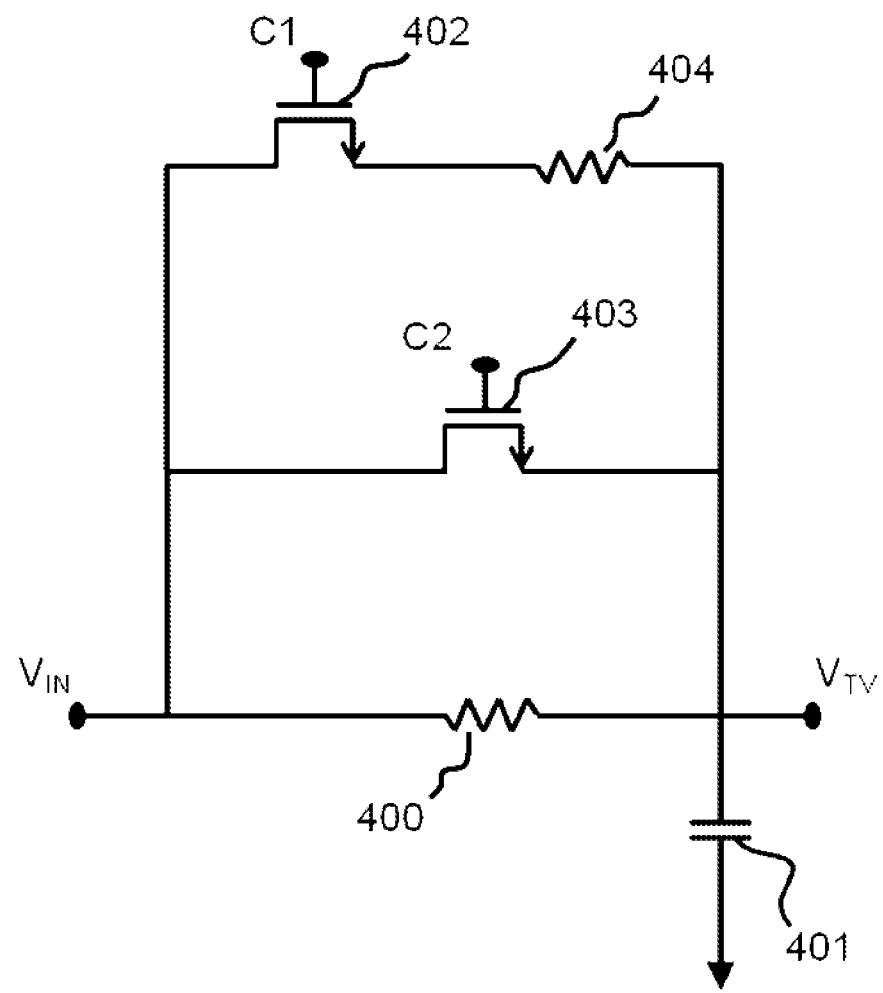
FIG. 4 illustrates a block diagram of a resistive-capacitive circuit for a fast reignition of a high intensity discharge lamp that is in accordance with the present invention.

FIG. 4 displays a diagram of a circuit that could take the place of RC circuit 303 in FIG. 3. The main elements of the RC circuit are timing phase resistor 400 and capacitor 401. The voltage on $V_{IN}$ is set to a certain level when the lamp is receiving power from the power supply. Assuming switches 402 and 403 are off, this will charge up the voltage on $V_{TV}$ to the same voltage level within a time period that is proportional to the magnitude of the resistance of resistor 400 multiplied by the capacitance of capacitor 401. This value has been referred to previously as the RC time constant of the circuit. When the lamp ceases to receive power from the power supply, $V_{IN}$ will drop to another value such as zero. When this occurs, the voltage on $V_{TV}$ will begin to decay towards zero according to the same RC time constant.

Correlation of the strike-restriction period set by a timer circuit comprising RC circuit 303 with a desired value can be achieved by allowing the RC circuit to have a variable RC time constant. In FIG. 4, switch 402 is in parallel with timing phase resistor 400 and is in series with resistor 404. Switch 402 is controlled by control signal C1 which allows resistor 404 to be isolated from the rest of the circuit, or available as an alternative path in parallel with resistor 400. This circuit can be implemented using any type of switching devices and is shown with an NMOS transistor simply to facilitate explanation. This circuit can be refined to initialize itself based on the variables that affect cool-down time that were mentioned above. If for example, the control circuit detects that the ambient temperature is very low and therefore the cool-down period will be very quick, it can adjust the time constant of the RC circuit by setting control signal C1 to a high value. This will place resistor 404 in parallel with resistor 400 which will decrease the resistance of the RC circuit and thereby decrease the strike-restriction period of the circuit to correlate it with the expected cool-down period. Alternative combinations of resistors and switches and the addition of additional branches could facilitate a more finely tunable RC constant for RC circuit 303.

Having an RC circuit with a variable RC time constant can also facilitate rapid charging of the RC circuit. It is possible that the heat-time relationship of the lamp will be different depending on whether the lamp is heating up or cooling off. Therefore, the charging and discharging time constants of the RC circuit will have to be altered to maintain correlation of the strike-restriction period and the cool-down period. Specific embodiments of the invention can allow the RC circuit to rapidly charge when power is being supplied to the lamp. Although in some cases this may overcompensate for the rate at which the temperature of the lamp increases, such embodiments would be simple to implement. A specific embodiment of the invention in accordance with this aspect of the invention can be described with reference again to FIG. 4. Switch 403 is controlled by control signal C2 which is set to a high voltage when the lamp receives power. When control signal C2 is set high, the resistance of switch 403 will drop to nearly zero. This will create an alternate low impedance path around resistor 400 which will allow capacitor 401 to charge much more rapidly. Once the circuit is charged, control signal C2 can drop to a low value which will return the circuit to the desired RC state to match the cool-down period with the strike-restriction period.

Given the large amount of variables that can affect the cool-down period of the lamp, it may be difficult to accurately estimate the cool-down period for a given set of inputs. Specific embodiments of the invention overcome this difficulty by having a self-calibrating strike-restriction period. Self-calibration begins by first allowing the ballast to restrike the lamp when the timer circuit indicates that a predetermined period of time has elapsed. This predetermined period is a first estimate of the cool-down period of the lamp. Following the reignition attempt, the apparatus detects if the lamp is receiving power from the power supply. If the lamp is receiving power, the system will know that the estimated cool-down period was sufficient for the current set of inputs. If the lamp is not receiving power from the power supply after the reignition attempt, the predetermined period could then be incremented for that set of inputs so that the next time the lamp went out under similar conditions the apparatus would try to wait a longer time before attempting to reignite the lamp.

Minor variations of the self-calibration process are possible. For example, the predetermined period of time could be decremented after a successful reignition to see if less time would suffice for the lamp cool-down under a given set of conditions. This approach would serve to allow an initial over estimate of the lamp cool-down period to be pared down to an optimal value. In addition, the first reinitialization after a failed reignition attempt need not be to the original predetermined period of time. Instead a reinitalization immediately after a failed restrike could be to a small period of time to account for the fact that the lamp has only been heated by a single failed reignition attempt.

Figure 5:
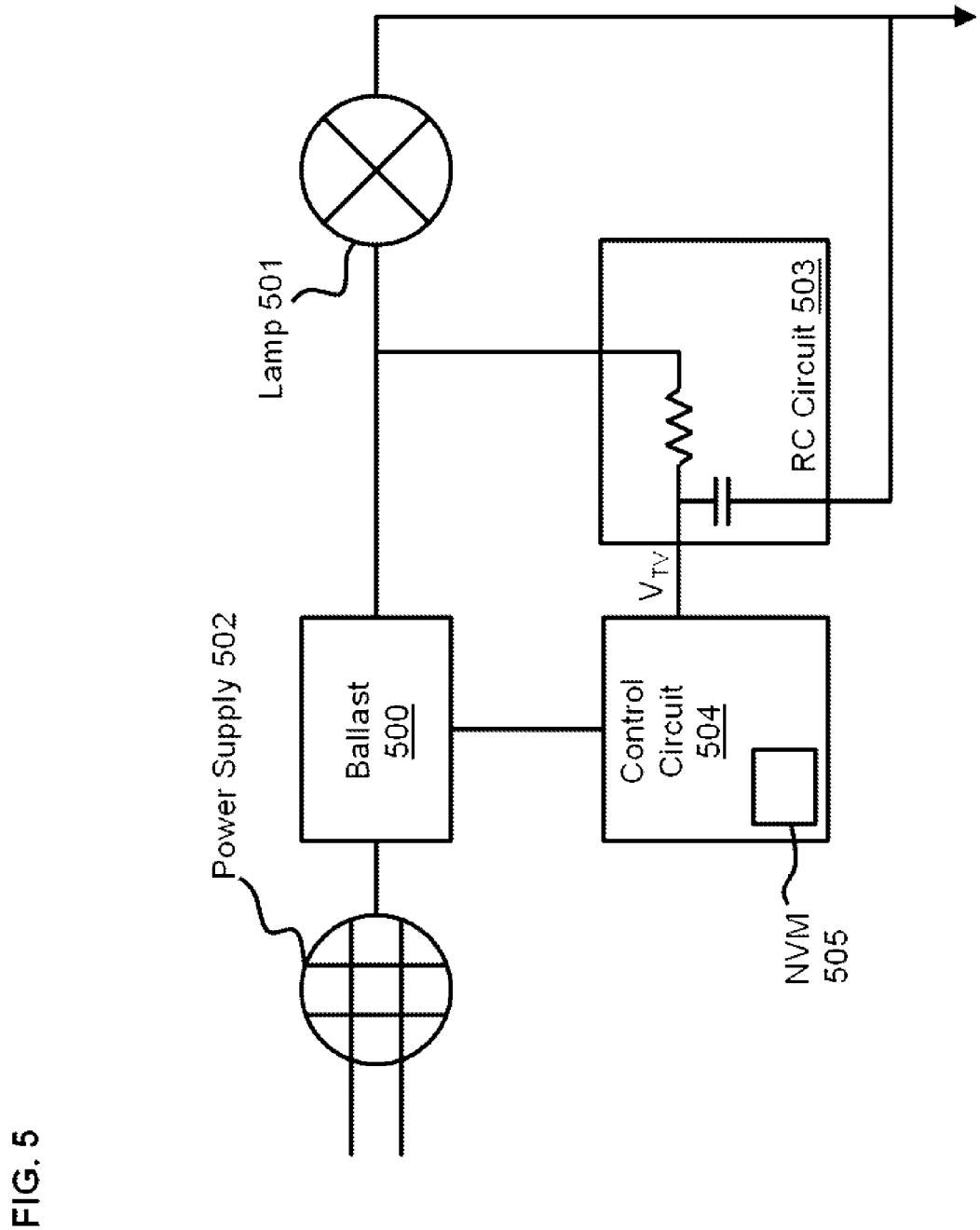
FIG. 5 illustrates a block diagram of an apparatus for a fast reignition of a high intensity discharge lamp using a resistive-capacitive circuit that is in accordance with the present invention.

Another specific embodiment of the present invention can be described with reference to FIG. 5. FIG. 5 illustrates an apparatus for a fast reignition of a high intensity discharge lamp. FIG. 5 illustrates an apparatus comprising ballast 500 operatively coupled to lamp 501. Ballast 500 is configured to receive power from power supply 502. In addition, the apparatus in FIG. 5 comprises a resistive-capacitive circuit 503 configured to be charged by power supply 502 when lamp 501 is receiving power from power supply 502, to discharge when lamp 501 ceases to receive power from power supply 502, and to output a timer voltage on node $V_{TV}$. Ballast 500 will not strike lamp 501 as long as timer voltage $V_{TV}$ is above a predetermined voltage level. In specific embodiments of the invention, the apparatus can also include a control circuit 504 which can store the predetermined voltage level in non-volatile memory and compare the voltage on node $V_{TV}$ to this predetermined voltage level. Embodiments of the invention that are in accordance with FIG. 5 can exhibit variable RC time constants, rapid re-initialization, and all the other additional features described with reference to FIG. 3. The storage of the predetermined voltage level in non-volatile memory is advantageous because it is in keeping with the design objective of limiting the amount of power required to keep track of how long it has been since the lamp ceased to receive power.

Figure 6:
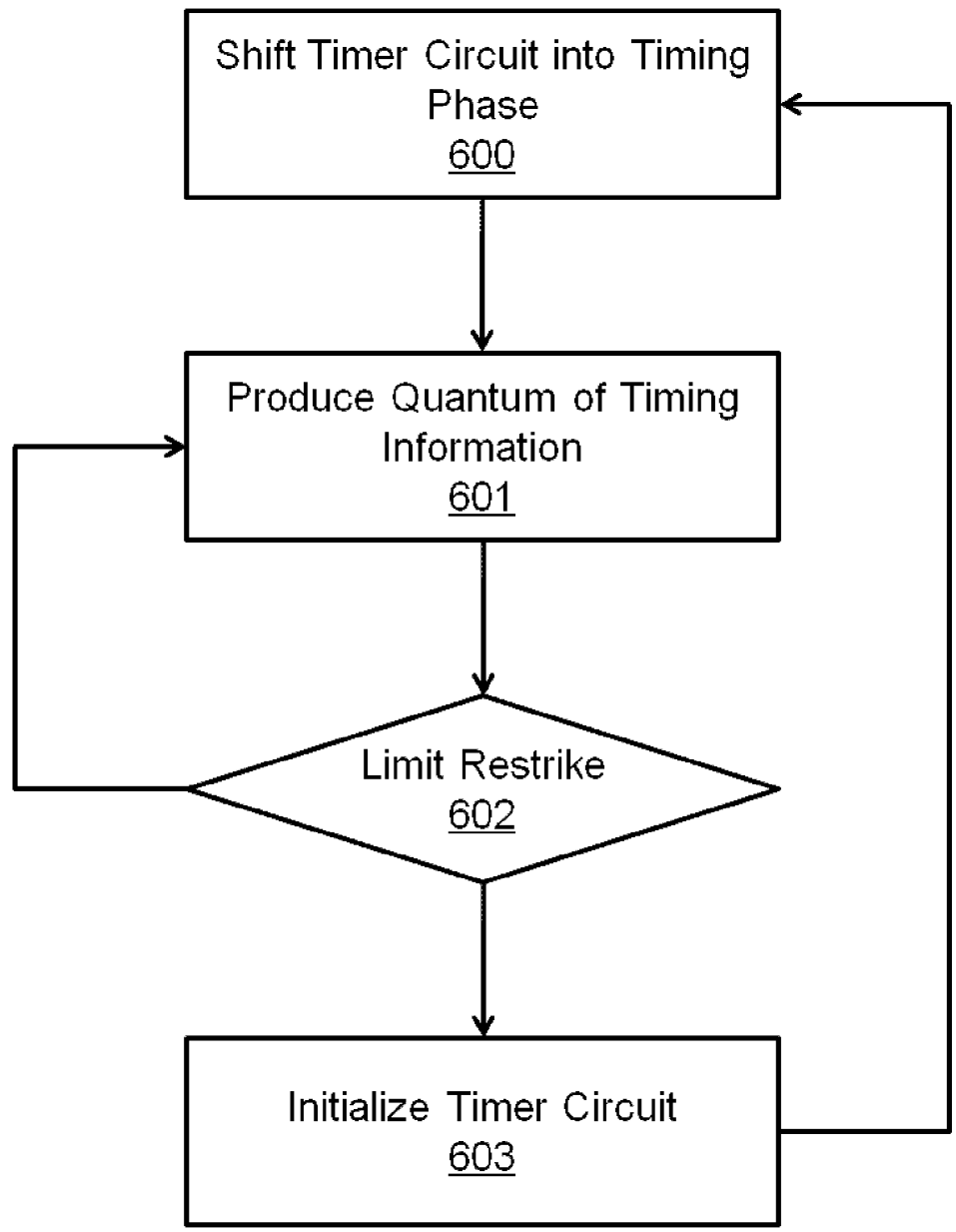
FIG. 6 illustrates a process flow chart of a method for a fast reignition of a high intensity discharge lamp that is in accordance with the present invention.

Another specific embodiment of the present invention can be described with reference to FIG. 6. FIG. 6 illustrates a method for a fast reignition of a high intensity discharge lamp that is in accordance with the present invention. In step 600, a timer circuit is shifted into a timing phase. This step will occur when the lamp ceases to receive power from a power supply. In step 601, a quantum of timing information is produced independently of external power. In step 602, a ballast is limited from reigniting the lamp for a period of time that is based at least in part on the quantum of timing information. This step could be repeated several times in a loop while additional quanta of timing information are produced in further iterations of step 601. For example, a clock circuit could produce a new timing signal every second to indicate how many seconds have passed since the timing phase was entered. In other specific embodiments of the present invention, this step is conducted only once as a single quantum of information is produced in the form of a flag signal indicating that a predetermined time period has elapsed. In step 603, the timer circuit is initialized when the lamp is ignited. If the timer circuit is a clock circuit powered by a battery, this step could involve resetting the clock to zero, and could additionally include altering the predetermined time period at which the control circuit will permit the ballast to strike the lamp.

Figure 7:
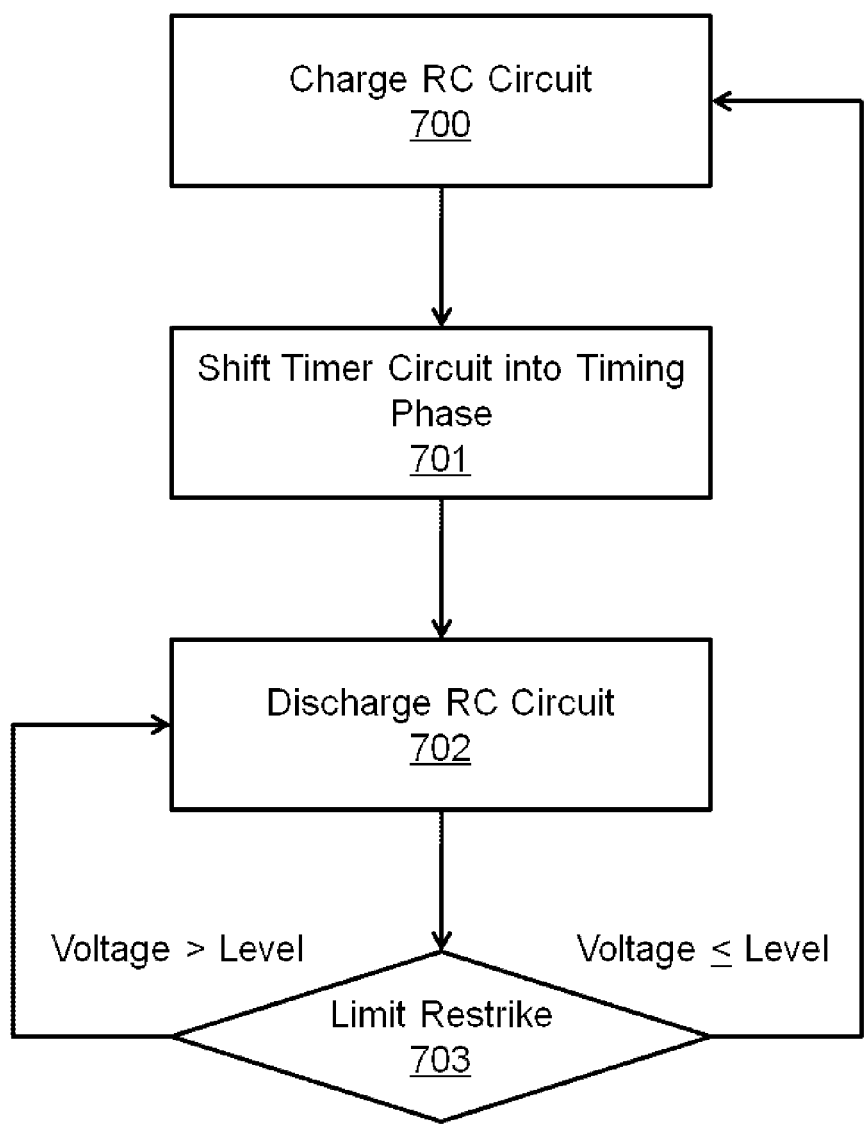
FIG. 7 illustrates a process flow chart of a method for a fast reignition of a high intensity discharge lamp comprising a resistive-capacitive circuit that is in accordance with the present invention.

Another specific embodiment of the present invention can be described with reference to FIG. 7. FIG. 7 illustrates a method for a fast reignition of a high intensity discharge lamp comprising an RC timer circuit that is in accordance with the present invention. In step 700, an RC circuit is charged by a power supply when the lamp is receiving power from the power supply. In step 701, a timer circuit—which in this situation comprises the RC circuit—shifts into a timing phase when the lamp ceases to receive power from the power supply. In step 702, the RC circuit discharges and the associate timer voltage beings to decay. In step 703, a ballast is limited from reigniting the lamp while the timer voltage is monitored. The steps of limiting and discharging the RC circuit will continue until the timer voltage drops below a predetermined value. At this point, the ballast will be permitted to ignite the lamp, and the system will be reinitialized for another cycle.

As mentioned previously, in specific embodiments of the present invention the strike-restriction period can be correlated with the cool-down period of the lamp. With reference to FIGS. 6 and 7, this is equivalent to assuring that the steps of 601 to 602 and 702 to 703 last for the cool-down period of the lamp. Specific embodiments of the invention capable of correlating the cool-down period of the lamp and the strike-restriction period were discussed previously and aspects of the invention discussed in reference to those embodiments including the initialization of the timer circuit and control circuit for different strike-restriction periods can also be applied to the methods described herein.

Figure 8:
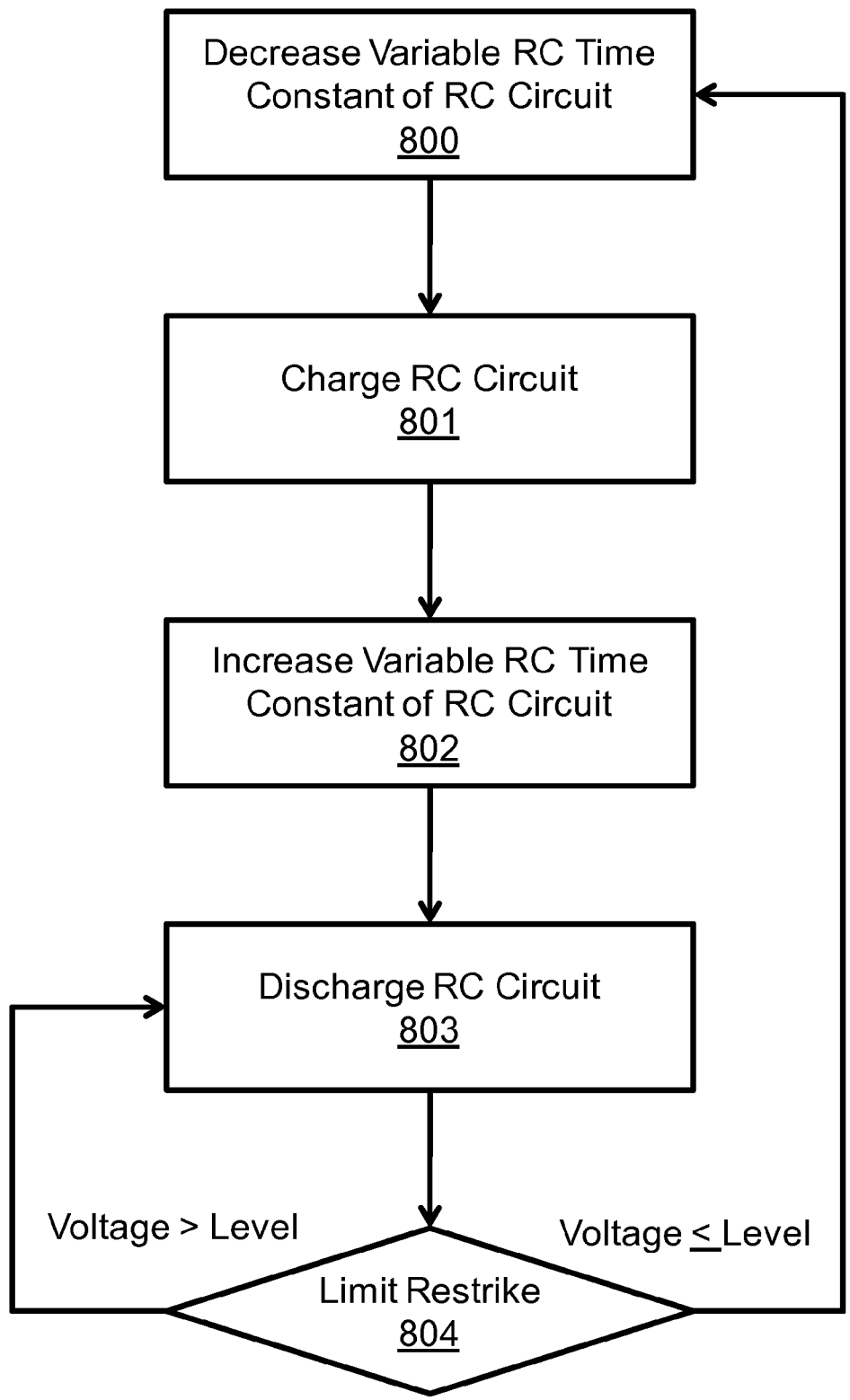
FIG. 8 illustrates a process flow chart of a method for a fast reignition of a high intensity discharge lamp comprising a variable resistive-capacitive circuit that is in accordance with the present invention.

Another specific embodiment of the present invention can be described with reference to FIG. 8. FIG. 8 illustrates a method for a fast reignition of a high intensity discharge lamp comprising an RC timer circuit that is in accordance with specific embodiments of the present invention described earlier wherein it is advantageous for the RC circuit to recharge faster than it discharges. In step 800, a variable RC time constant of the RC circuit is decreased. In step 801, the RC circuit is charged by a power supply when the lamp is receiving power from the power supply. In steps 802 and 803, a variable RC time constant of the RC circuit is increased and the circuit begins to discharge when the lamp ceases to receive power from the power supply. In step 804, a ballast is limited from reigniting the lamp while the timer voltage is monitored. While discharging in step 803, the RC circuit voltage begins to decay but with a longer time constant than when it was charged. Once the timer voltage drops below the predetermined value the system will reinitialize and the RC time constant will again be decreased in step 800.

Figure 9:
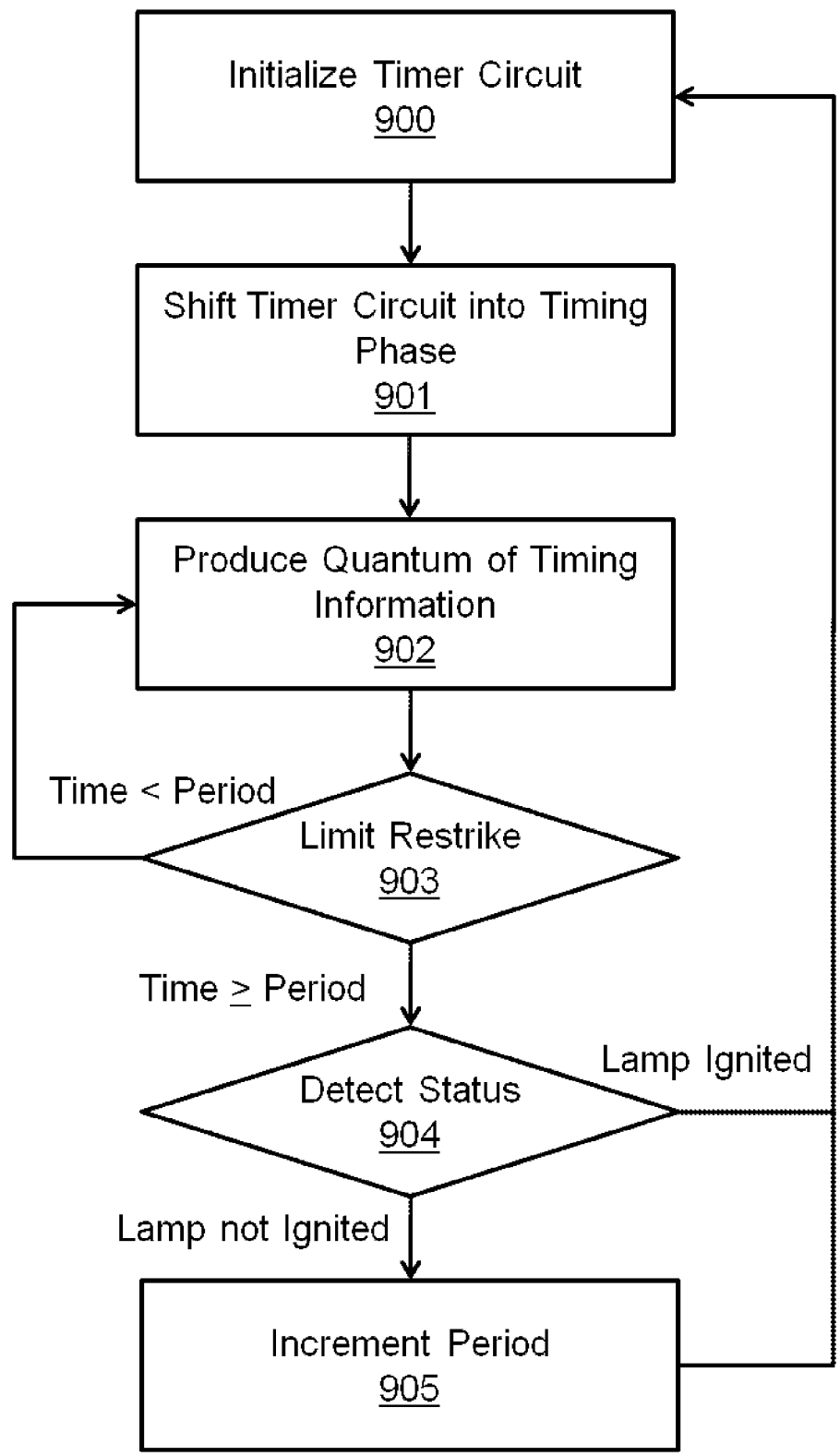
FIG. 9 illustrates a process flow chart of a method for a fast reignition of a high intensity discharge lamp comprising a self-calibrating strike-restriction period that is in accordance with the present invention.

Another specific embodiment of the present invention can be described with reference to FIG. 9. FIG. 9 illustrates a method for a fast reignition of a high intensity discharge lamp that is in accordance with specific embodiments of the present invention described earlier wherein the strike-restriction period is self-calibrating. In step 900, a timer circuit is initialized. In step 901, a timer circuit is shifted into a timing phase when the lamp ceases to receive power from the power supply. In step 902, a quantum of timing information is produced by the timer circuit. In step 903, the ballast is again limited from reigniting the lamp for a period of time that is based in part on the quantum of timing information. In this case, step 903 also depends on a predetermined period of time which is a first estimate of the cool-down period of the lamp. The steps of limiting and producing will continue until the timer voltage drops below a predetermined value. In specific embodiments of the invention, these steps are each only executed once. In step 904, the status of the lamp is detected to determine if it was ignited after the strike-restriction period ended. At this point, the system will transfer back to step 900 if the lamp is ignited, and to step 905, if the lamp is not ignited. If the lamp is ignited, the predetermined period of time was an accurate approximation of the cool-down period of the lamp. The lamp cooled and was successfully ignited. If the lamp is not ignited, the system did not wait long enough for the lamp to cool. In that case, the predetermined period of time will be incremented in step 905 and the circuit will be re-initialized in step 900 with a larger predetermined period.

As mentioned previously, in specific embodiments of the invention the re-initialization after an unsuccessful ignition may be to some lower value that takes into account the fact that the lamp has only been heated by a single failed reignition attempt. In this case, the incremented pre-determined period will be saved for the next time the lamp goes out. If the timer circuit comprises an RC circuit, then the step of incrementing the pre-determined period in step 905 will comprises incrementing the variable RC time constant of the RC circuit.

Although embodiments of the invention have been discussed primarily with respect to specific embodiments thereof, other variations are possible. Various configurations of the described system may be used in place of, or in addition to, the configurations presented herein. For example, although the control circuit and timer circuit were discussed as if they were two separate entities, the two could be integrated into the same chip or have any other spatial-architectural relationship. In addition, the methods for initialization of the timer circuit can be accomplished in many different orders in terms of when the inputs determining the initialization conditions are measured and how they are applied to effect the strike-restriction period. The clock circuit does not need to be a digital clock. Also, the switches used in the restive-capacitive circuit could be any type of switching element. Likewise, the resistive-capacitive circuit could take on various other architectures so long as the transitive time constant of the system was configured to function in accordance with the apparatus and methods discussed herein.

Those skilled in the art will appreciate that the foregoing description is by way of example only, and is not intended to limit the invention. Nothing in the disclosure should indicate that the invention is limited to systems that require power from a main grid or are meant to power only a certain selection of lamp wattages and required ballast frequencies. Functions may be performed by hardware or software, as desired. In general, any diagrams presented are only intended to indicate one possible configuration, and many variations are possible. Those skilled in the art will also appreciate that methods and systems consistent with the present invention are suitable for use in a wide range of applications encompassing any related to lighting systems.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. An apparatus for a fast reignition of a high intensity discharge lamp comprising:
   a ballast operatively coupled to said lamp, and configured to receive power from a power supply;
   a timer circuit configured to enter a timing phase and produce a quantum of timing information when said lamp ceases to receive power from said power supply; and
   a control circuit configured to receive said quantum of timing information and permit said ballast to restrike said lamp based on said quantum of timing information;
   wherein said timer circuit is powered internally during said timing phase;
   wherein said timer circuit further comprises a resistive-capacitive circuit configured to be charged by said power supply when said lamp is receiving power from said power supply, to discharge when said timer circuit is in said timing phase, and to output a timer voltage; and
   wherein said control circuit is configured to permit said ballast to restrike said lamp when said timer voltage drops below a predetermined level which indicates that a cool-down period of said lamp has elapsed.

2. The apparatus of claim 1, wherein said timer circuit further comprises:
a clock circuit configured to run when said lamp ceases to receive power from said power supply and to initialize when said lamp is ignited; and
a battery configured to power said clock circuit when said lamp ceases to receive power from said power supply.

3. The apparatus of claim 2, wherein said control circuit is configured to permit said ballast to restrike said lamp when said quantum of timing information indicates that said cool-down period of said lamp has elapsed.

4. The apparatus of claim 2, wherein said control circuit is configured to:
permit said ballast to restrike said lamp when said quantum of timing information indicates that a predetermined period has elapsed;
detect if said lamp is receiving power from said power supply; and
reinitialize said timer circuit and increment said predetermined period if said lamp is not ignited by a restrike.

5. The apparatus of claim 1, wherein:
said resistive-capacitive circuit is configured to have a variable RC time constant; and said variable RC time constant is set to a low value while said resistive-capacitive circuit is being charged and a high value during said timing phase.

6. An apparatus for a fast reignition of a high intensity discharge lamp comprising:
a ballast operatively coupled to said lamp, and configured to receive power from a power supply; and
a resistive-capacitive timer circuit configured to be charged by said power supply, discharge when said lamp ceases to receive power from said power supply, and output a timer voltage;
wherein said ballast will not strike said lamp if said timer voltage is above a predetermined voltage level;
wherein said timer circuit further comprises a resistive-capacitive circuit configured to be charged by said power supply when said lamp is receiving power from said power supply, to discharge when said timer circuit is in said timing phase, and to output a timer voltage; and
wherein said control circuit is configured to permit said ballast to restrike said lamp when said timer voltage drops below a predetermined level which indicates that a cool-down period of said lamp has elapsed.

7. The apparatus of claim 6, further comprising:
a control circuit configured to store said predetermined voltage level in a non-volatile memory, and to compare said timer voltage to said predetermined voltage level;
wherein said timer voltage is substantially equivalent to said predetermined voltage level when said lamp has ceased to receive power from said power supply for a period of time equal to said cool-down period of said lamp.

8. The apparatus of claim 7, wherein said resistive-capacitive timer circuit is configured to have a low RC time constant while being charged and a high RC time constant while being discharged.

9. The apparatus of claim 8, wherein said control circuit is configured to check said timer voltage during a startup phase, and wait to send a strike signal to said ballast if said timer voltage is not below a predetermined threshold.

10. A method for a fast reignition of a high intensity discharge lamp comprising the steps of:
shifting a timer circuit into a timing phase when said lamp has ceased to receive power from a power supply;
producing a quantum of timing information using an internally powered timer system during said timing phase; and
limiting a ballast from re-striking said lamp for a time period based at least in part on said quantum of timing information;
wherein said timer circuit further comprises a resistive-capacitive circuit configured to be charged by said power supply when said lamp is receiving power from said power supply, to discharge when said timer circuit is in said timing phase, and to output a timer voltage; and
wherein a control circuit is configured to permit said ballast to restrike said lamp when said timer voltage drops below a predetermined level which indicates that a cool-down period of said lamp has elapsed.

11. The method from claim 10, further comprising the steps of:
initializing said timer circuit when said lamp is ignited;
wherein said timer circuit is a clock circuit configured to be powered by a battery and run when said lamp ceases to receive power from said power supply.

12. The method of claim 11, wherein said time period is set by said cool-down period of said lamp.

13. The method of claim 11, further comprising the steps of:
detecting if said lamp is ignited;
incrementing a predetermined period of time if said lamp is not ignited; and
reinitializing said timer circuit if said lamp is not ignited;
wherein said time period is set by said predetermined period of time.

14. The method from claim 10, further comprising the steps of:
charging said resistive-capacitive circuit with said power supply when said lamp is receiving power from said power supply; and
discharging said resistive-capacitive circuit when said timer circuit is in said timing phase;
wherein said timer circuit comprises said resistive-capacitive circuit.

15. The method from claim 14, wherein said time period is set by a predetermined voltage level past which said timer voltage drops when said cool-down period of said lamp has elapsed.

16. The method from claim 14, further comprising the steps of:
lowering a variable RC time constant of said resistive-capacitive circuit when said resistive-capacitive circuit is being charged; and
increasing said variable RC time constant of said resistive-capacitive circuit when said timer circuit is in said timing phase.

17. The method of claim 14, further comprising the steps of:
detecting if said lamp is ignited;
incrementing said variable RC time constant of said resistive-capacitive circuit if said lamp is not ignited; and
reinitializing said timer circuit if said lamp is not ignited.

* * * * *

UNITED STATES PATENT AND TRADEMARK OFFICE
CERTIFICATE OF CORRECTION

PATENT NO. : 8,294,376 B2  Page 1 of 1
APPLICATION NO. : 12/790830
DATED : October 23, 2012
INVENTOR(S) : Davis et al.

It is certified that error appears in the above-identified patent and that said Letters Patent is hereby corrected as shown below:

In column 12, line 27, claim 12, please make the following deletion/insertion in claim 12:

12. The method of claim 11, wherein said time period is set by said "cool-downperiod" --cool-down period-- of said lamp.

Signed and Sealed this
Fourth Day of December, 2012

David J. Kappos
*Director of the United States Patent and Trademark Office*